United States Patent
Cai et al.

(10) Patent No.: US 7,903,894 B2
(45) Date of Patent: Mar. 8, 2011

(54) COLOR IMAGE CODING USING INTER-COLOR CORRELATION

(75) Inventors: Hua Cai, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 909 days.

(21) Appl. No.: 11/543,576

(22) Filed: Oct. 5, 2006

(65) Prior Publication Data

US 2008/0085058 A1    Apr. 10, 2008

(51) Int. Cl.
*G06K 9/46* (2006.01)

(52) U.S. Cl. .................................... 382/247

(58) Field of Classification Search .............. 382/247
See application file for complete search history.

(56) References Cited

U.S. PATENT DOCUMENTS

| | | | | |
|---|---|---|---|---|
| 5,903,676 A | * | 5/1999 | Wu et al. ............... | 382/244 |
| 6,243,418 B1 | | 6/2001 | Kim | |
| 6,285,795 B1 | | 9/2001 | Cho | |

FOREIGN PATENT DOCUMENTS

KR          2005003029 A     6/2003

OTHER PUBLICATIONS

Hua Cai; Xing San; Jiang Li, "Embedded image coding with context partitioning and quantization," Image Processing, 2005. ICIP 2005. IEEE International Conference on , vol. 2, No., pp. II-241-4, Sep. 11-24, 2005.*

Egger, O.; Fleury, P.; Ebrahimi, T.; Kunt, M.; , "High-performance compression of visual information-a tutorial review. I. Still pictures," Proceedings of the IEEE , vol. 87, No. 6, pp. 976-1013, Jun. 1999. URL: http://ieeexplore.ieee.org/stamp/stamp.jsp?tp=&arnumber=763312&isnumber=16546.*

M. Rabbani and R. Joshi, "An overview of the JPEG2000 still image compression standard," Signal Processing: Image Communication 17, pp. 3-48, Jan. 2002.

Search Report, Ref. No. 317969.01WO, for App No. PCT/US2007/080012, mailed Feb. 13, 2008.

* cited by examiner

*Primary Examiner* — Bhavesh M Mehta
*Assistant Examiner* — Nirav G Patel
(74) *Attorney, Agent, or Firm* — L. Alan Collins; Collins & Collins Incorporated

(57) ABSTRACT

Described is an image compression technology by which a coefficient representative of a chrominance component corresponding to an (x, y) coordinate pair is coded into a symbol, along with plurality of context events associated with that symbol, to facilitate more efficient context-based arithmetic coding. For example, four context events may be generated, including one context event based on the corresponding (x, y) coefficient value in the luminance component, and three context events based on other luminance coefficients that have adjacent horizontal, vertical and diagonal relationships with the corresponding luminance component's coefficient, respectively. In one example implementation, coding the chrominance coefficient and computing the plurality of context events occurs in a zero coding pass of an entropy coder. A sign coding pass and a magnitude refinement pass may be performed to obtain further symbols for the context-based arithmetic coding.

13 Claims, 5 Drawing Sheets

COLOR IMAGE CODING USING INTER-COLOR CORRELATION

BACKGROUND

The quality of digital images continues to improve as advances in digital imaging technology provide increasingly higher resolution and color variation. In general, however, as image quality increases, the resultant image data files increase geometrically in size.

To reduce the storage required to store image data and the bandwidth needed to transmit image data, image compression technologies are employed, such as those based on JPEG standards. In general, a JPEG encoder is designed to allow its operator to trade off the resultant data file size of an image against that image's quality when decoded. As can be readily appreciated, any significant improvement in compression that does not have a corresponding reduction in image quality is desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards an image compression technology by which a coefficient representative of a chrominance component corresponding to an (x, y) coordinate pair is coded into a symbol. For that symbol, a plurality of context events are coded, each of which are based upon a corresponding coefficient of a luminance component at the (x, y) coordinate pair and at least one other coefficient of another luminance component having a coordinate relationship with the (x, y) coordinate pair. The symbol is associated with the context events for more efficient context-based arithmetic coding.

In one example implementation, coding the chrominance coefficient and computing the plurality of context events occurs in a zero coding pass of entropy coding. In this example implementation, coding the chrominance coefficient into the symbol and computing the plurality of context events comprises comparing the coefficients against a decreasing (e.g., halved) threshold value until the coefficient representative of the chrominance component meets the threshold. When the threshold is met, a sign coding pass and a magnitude refinement pass may be performed to obtain further symbols for the context-based arithmetic coding.

Computing the context events may comprise generating four context events, including one context event based on the corresponding coefficient in the luminance component, and three context events based on other luminance coefficients that have adjacent horizontal, vertical and diagonal relationships with the corresponding luminance component's coefficient. For example, four such context events, $C_1$-$C_4$, may be obtained from the following computations, where each $|S_Y(x\text{-coordinate identifier, y-coordinate identifier})|$ refers to an absolute value of a coefficient of a luminance component at coordinates relative to an (x, y) coordinate pair of the chrominance component, and T refers to the threshold value:

$C_1 = 1$, if $|S_Y(x,y)| \geq T$; otherwise, $C_1 = 0$;
$C_2 = 1$, if $|S_Y(x,y-1)| \geq T$ OR $|S_Y(x,y+1)| \geq T$; otherwise, $C_2 = 0$;
$C_3 = 1$, if $|S_Y(x-1,y)| \geq T$ OR $|S_Y(x+1,y)| \geq T$; otherwise, $C_3 = 0$;
$C_4 = 1$, if $|S_Y(x-1,y-1)| \geq T$ OR $|S_Y(x+1,y-1)| \geq T$ OR $|S_Y(x-1,y+1)| \geq T$ OR $|S_Y(x+1,y+1)| \geq T$; otherwise, $C_4 = 0$.

In one example, a symbol is generated by comparing a coefficient representing a component of an image against a threshold value, and if the threshold value is met, setting a symbol to a first value, e.g., binary one. A first context event set is generated for associating with the symbol if the image component is a luminance component, or a second context event set is generated for associating with the symbol if the image component is a chrominance component. Generating the second context event set includes using at least two coefficients representing luminance components that each has a relationship with the chrominance component. For example, one context event may be generated by comparing a luminance coefficient that has an identical coordinate relationship with the chrominance component's (x, y) coordinates against the threshold value. A second, third and fourth context event may be made by threshold comparisons against luminance coefficients having adjacent horizontal, adjacent vertical and adjacent diagonal coordinate relationships, respectively.

A system in an image processing environment may include an encoder that inputs source data and outputs compressed image data based on the source image data. To this end, the encoder includes a zero coding pass component, a sign coding pass component and a magnitude refinement coding pass component that provide symbols and associated context events to a context-based arithmetic coding component. The zero coding pass component includes a symbol generator that generates at least one zero pass symbol representative of a selected chrominance component, and an inter-color context events generator that generates the context events for association with each zero pass symbol, in which the context events generator generates the context events based on a set of at least two luminance components that each have a relationship with the selected chrominance component.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards encoding and decoding images such that between encoded and decoded states, the data representing the image is compressed to facilitate better storage and/or transmission. One way in which the technology may be used is to improve the compression rates in JPEG image compression, whether based on conventional JPEG standards or JPEG 2000 standards; (JPEG 2000 is described in the reference by Majid Rabbani and Rajan Joshi, "*An overview of the JPEG2000 still image compression standard*." Signal Processing: Image Communication 17 (2002) 3-48). As will be understood, however, the technology described herein may provide benefits in other types of image compression, including image compression in other formats, and/or compression of static images and/or moving images. Moreover, the technology may provide benefits in either lossless or lossy compression.

As will be understood, in one example implementation, while encoding an image arranged with chrominance (U and V) components, related luminance (Y) components are used to generate additional information, referred to as context events, that better improve compression. In this example implementation, four inter-color context events are generated based upon the Y coefficient corresponding to a U or V coefficient being encoded and the Y coefficient's surrounding coefficients, e.g., including context events based on the corresponding coefficient in the Y component and Y coefficients with adjacent horizontal, vertical and diagonal relationships therewith. Notwithstanding, it can be readily appreciated that more inter-color context events may be selected to provide even better performance. However, the further improvement is relatively limited compared to the increase in complexity, and, based upon analysis and tests, the four context events already cover most inter-color correlation. Also, note that when the U or V component is coded, the above four inter-color context events can be combined with conventional spatial context events that are obtained from the same component (e.g., the neighboring coefficients of the same component).

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
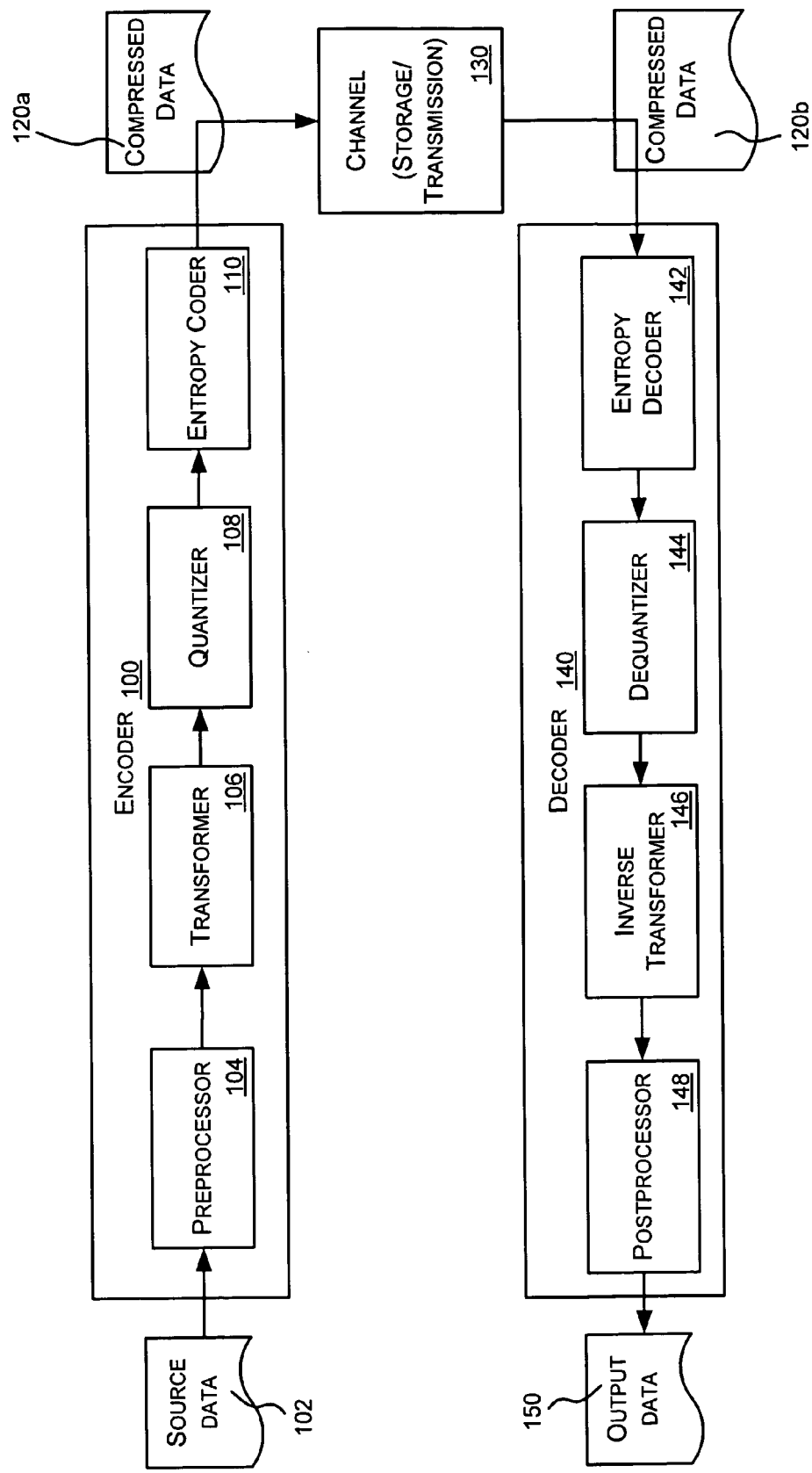
FIG. 1 shows an illustrative example block diagram of a general-purpose encoder and decoder into which various aspects of the present invention may be incorporated.

FIG. 1 shows a functional block diagram of a representative image encoder 100 used to compress source data 102, paired with a decoder 140 that decompresses data into output data 150. By way of example, the source data 102 may include a grayscale image and a color image.

When the encoder 100 receives the source data 102 in one example embodiment, the encoder 100 first presents the source data 102 to a preprocessor 104. Typically, in color image coding, color signals such as RGB (red, green, and blue) or the like (e.g., CMYK or HSV) are separated by the preprocessor 104 into luminance (Y) components corresponding to a grayscale image, and chrominance (U and V) components that provide the color information.

The output of the preprocessor 104 is received at a transformer 106 that performs frequency transformation on the output of preprocessor 104. The transformer 106 may perform discrete wavelet transformation (DWT), discrete cosine transformation (DCT), or any other similar frequency domain transformation on the preprocessed data.

Note that individual data values vary less from neighboring values in the transformed frequency domain data, as compared to the spatial domain data. Taking advantage of the less variant data values in the frequency domain data, the quantizer 108 identifies and aggregates data values that have identical values, and replaces a repeating series of identical data values with one instance of the data value combined with an indication of how many times that identical data value repeats. Similarly, the quantizer 108 may combine a series of similar but not identical values with a single identical value when the data values fall within a particular tolerance. Aggregating similar but not identical data values is used in lossy compression, in which some degradation of the original image is acceptable.

The output of the quantizer 108 is presented to an entropy coder 110 that generates the compressed image data 120. In general, entropy coding compresses data by identifying or predicting the frequency with which data values occur in a data file. Then, instead of representing each data value with a fixed, equal-length value, entropy coding represents more frequently appearing data values with shorter binary representations. By replacing frequently appearing data values with shorter representations instead of fixed, equal-length representations, the entropy coder 110 reduces the size of the compressed data 120a.

As represented in FIG. 1, the compressed data 120a generated by the entropy coder 110 is presented to a channel 130. The channel 130 may include any type of data storage and/or data transmission media. The output of the channel 130 is represented as compressed data 120b, which may be identical to the compressed data 120a, particularly if transmitting directly, but is labeled separately to indicate it may be a copy, or may be available at a later time. Further, the compressed data 120b may be obtained after some additional processing of the compressed data 120a, e.g., it may be a lower-quality and/or reduced-size image such as if being sent to a small screen or as a miniaturized representation thereof, and/or on a low bandwidth connection.

A decoder 140 receives or retrieves the compressed data 120b from the channel 130. The decoder 140 basically decompresses the compressed data 120b through a mirror image of the process applied by the encoder 100. More particularly, and as is generally known, the compressed data 120b is translated by an entropy decoder 142, a dequantizer 144, an inverse transformer 146, and a postprocessor 148 that ultimately presents output data 150, such as image or video data suitable for presenting on a display or any other devices. For purposes of simplifying the description herein, the technology will be primarily described with reference to the encoder 100/entropy coder 110, as those skilled in the art will recognize that the decoder components basically mirror the encoder components.

The context of coding monochrome images have been well studied and widely used. More particularly, when color images are coded, both the luminance component and chrominance components are usually coded independently, by using the context found in the monochrome images. However, although the use of monochrome images simplify coding system design, coding efficiency is reduced, primarily because the correlation among different color components is not exploited.

The technology described herein presents new inter-color context events that can be used for coding the chrominance components. Because these inter-color context events well model the inter-color correlation existing between luminance and chrominance components, better coding efficiency when compressing the chrominance components is achieved, e.g., a bit rate reduction on the order of ten percent in coding the chrominance components.

In a typical high efficient image codec such as JPEG 2000, context-based arithmetic coding, whose coding mechanism is based on some predefined contexts events generated from previous coded samples, is adopted by the entropy coder 110. This allows the entropy coder 110 to effectively exploit statistical correlations in the data.

More particularly, in context-based arithmetic coding, a symbol s is encoded under a group of context events $C_1$, $C_2 \ldots C_N$, where $C_i$ is a certain context event. A context event is an event that has some correlation to the symbol s, such that the value of the symbol can be predicted from the value of the context event. For example, in grayscale image coding, the values of the neighboring wavelet coefficients are often selected as context events when a wavelet coefficient is coded. Usually, both the symbol and the context events are binary, i.e., the individual value of s, $C_1, \ldots,$ and $C_N$ is either one or zero.

It is pointed out herein that the shapes of the chrominance (U and V) components can often be recognized from that of the luminance (Y) component. This phenomenon indicates that most chrominance changes in a real scene are accompanied by a luminance change. Through statistical analysis, in one example implementation, four inter-color context events in the wavelet domain for coding the chrominance (U and V) components are provided.

Figure 2:
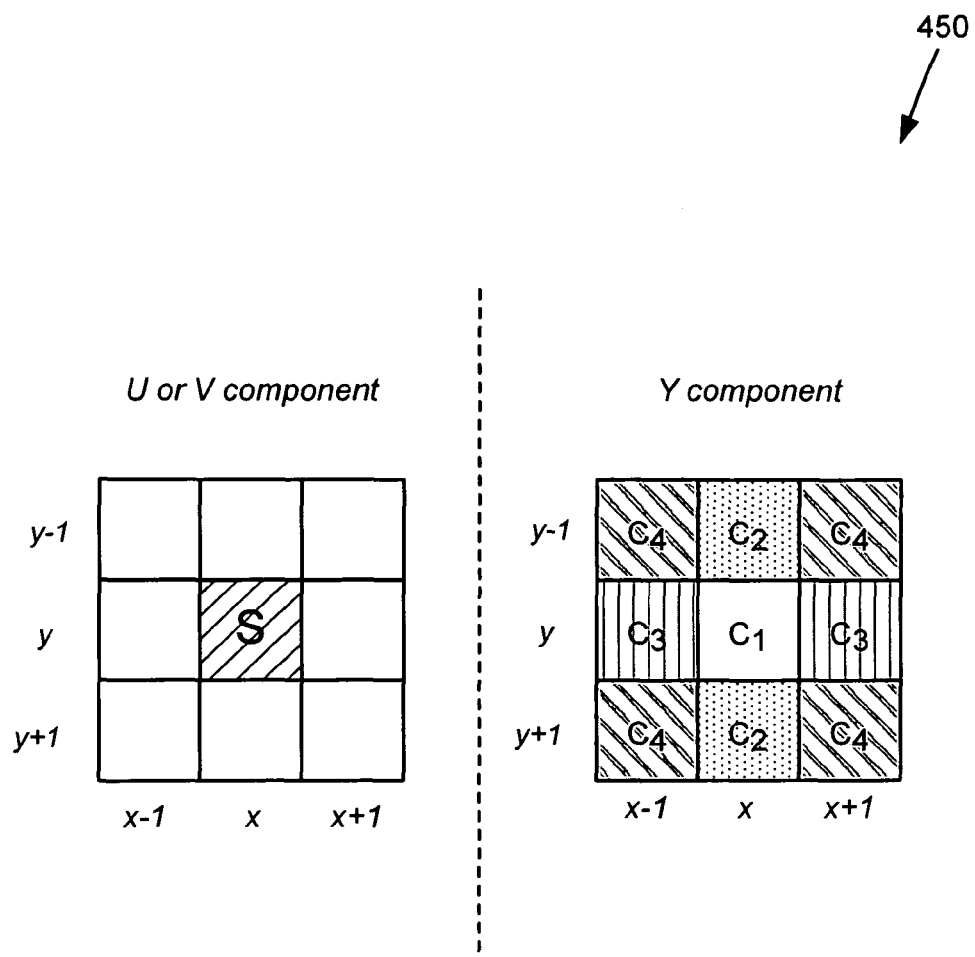
FIG. 2 is a representation of data to be coded for a chrominance component in an image, and corresponding luminance component data used for generating inter-color context events related to the chrominance component and used in coding the chrominance component.

In this example implementation, represented in FIG. 2, four new context events are obtained from the Y component when the U or V component is coded. For example, as represented on the left side of FIG. 2, when coding the U or V component for a coefficient S with (x,y) coordinates, S(x,y), let $S_Y(x,y)$ denote the corresponding coefficient with the same coordinates (x,y) in the Y component. In this example implementation, the four inter-color context events are obtained from the following (where T is a comparison threshold and |x| denotes the absolute value of x):

$C_1 = 1$, if $|S_Y(x,y)| >= T$; otherwise, $C_1 = 0$;
$C_2 = 1$, if $|S_Y(x,y-1)| >= T$ OR $|S_Y(x,y+1)| >= T$; otherwise, $C_2 = 0$;
$C_3 = 1$, if $|S_Y(x-1,y)| >= T$ OR $|S_Y(x+1,y)| >= T$; otherwise, $C_3 = 0$;
$C_4 = 1$, if $|S_Y(x-1,y-1)| >= T$ OR $|S_Y(x+1,y-1)| >= T$ OR $|S_Y(x-1,y+1)| >= T$ OR $|S_Y(x+1,y+1)| >= T$; otherwise, $C_4 = 0$.

As can be readily appreciated, additional context events may be generated by expanding the surrounding area beyond x±1 and/or y±1, at least in part. Further, different logical combinations may be used, e.g., AND-ing or XOR-ing instead of OR-ing in computing any of $C_2$ through $C_4$, or more complex combinations, e.g., using diagonally adjacent coefficients to some extent in computing $C_2$ and $C_3$, and using horizontally and/or vertically adjacent coefficients at least in part in computing $C_4$. Note that when no adjacent coefficient or coefficients exist due to being at an edge, the "missing" coefficient can be considered as not meeting the threshold, or as meeting it, or a special case of one or zero may be defined as the resulting context event, regardless of other computations. Alternatively, a different computation may be used, e.g., based on the value of another coefficient and/or on a combination of other coefficients that are available. Still further, the same or different threshold values may be used in the comparisons, e.g., the luminance component's coefficients can be compared against another threshold value, such as one based on the threshold value used in coding the symbol.

To use the inter-color context events in color image coding in one example, for the embedded coding of a coefficient S(x,y), the coefficient compared with a series of decreasing thresholds T (or bit plane, the value of a certain threshold is half of its prior threshold). Coding at each threshold is known as a coding pass. Usually, there are three types of successive coding passes, namely zero coding, sign coding, and magnitude refinement coding (as explained in the aforementioned JPEG 2000 reference). As will be understood, the new inter-color context events are used in the zero coding pass when the U and V components are coded.

Figure 3:
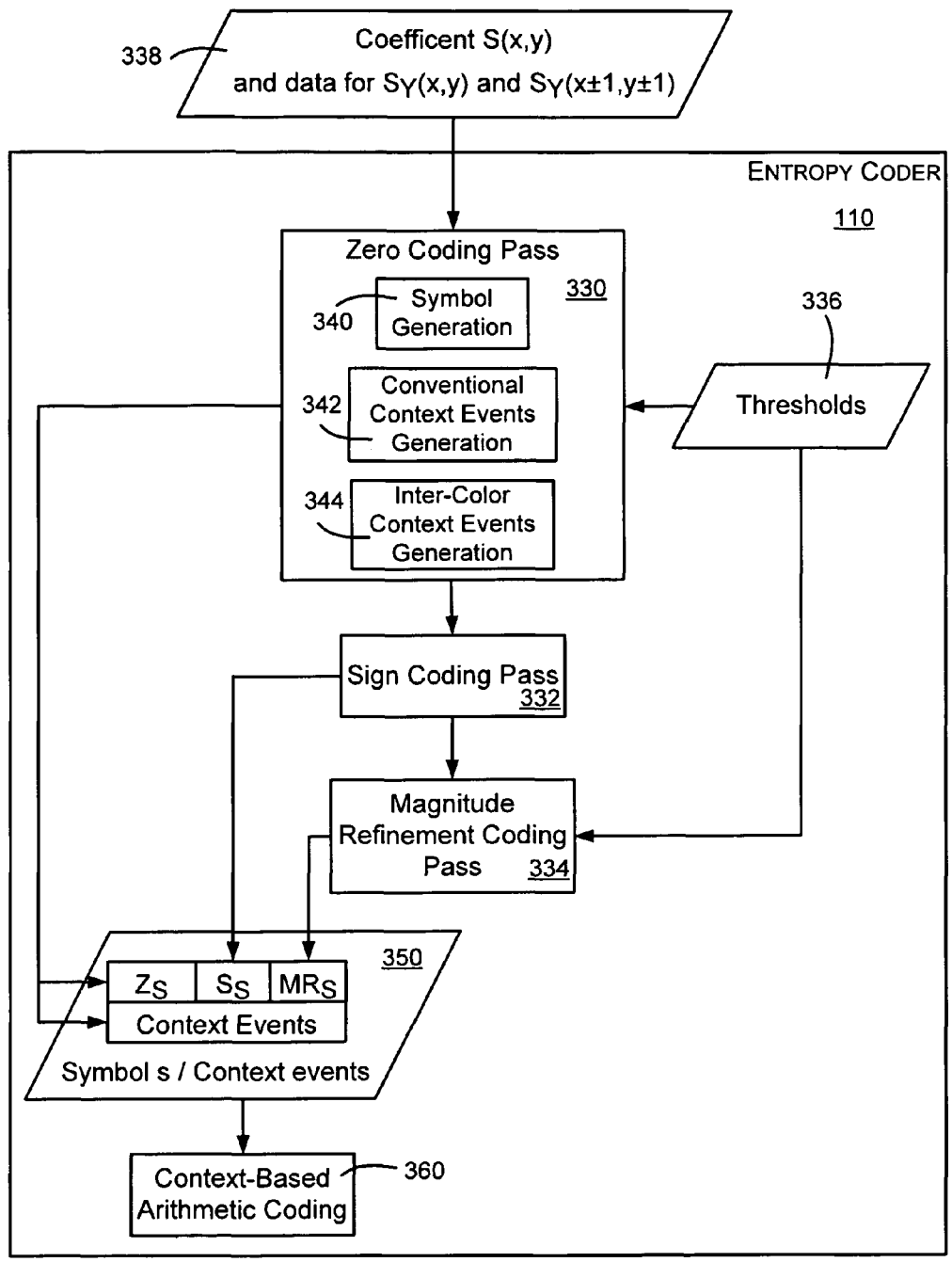
FIG. 3 is a block diagram representing various example components within the entropy coder of an encoder for including a component for generating inter-color context events.

FIG. 3 represents components within the entropy coder 110, including a component for the zero coding pass 330, a component for the sign coding pass 332, and a component for the magnitude refinement coding pass 334. In general, the zero coding pass is performed first, with data 338 comprising the coefficient S(x,y) and coefficients for the corresponding coefficient with the same coordinates (x,y) in the Y component, $S_Y(x,y)$, and those horizontally, vertically and diagonally adjacent thereto, e.g., $S_Y(x+1,y)$, $S_Y(x-1,y)$ are horizontally adjacent, $S_Y(x,y+1)$, $S_Y(x,y-1)$, are vertically adjacent, and $S_Y(x+1,y+1)$, $S_Y(x+1,y-1)$, $S_Y(x-1,y+1)$, $S_Y(x-1,y-1)$ are diagonally adjacent.

The symbol s generated from the coefficient S(x,y) in a symbol generation part 340 for this zero coding pass 330, and if S(x,y) is obtained from the Y component, then the conventional context events like those in JPEG2000 are generated, represented in FIG. 3 via block 342. Alternatively, if S(x,y) is obtained from the U or V component, then the above-described four inter-color context events, $C_1$, $C_2$, $C_3$ and $C_4$ based on the corresponding Y component coefficients are used in the combination of the conventional context events, represented in FIG. 3 via block 344.

Figure 4:
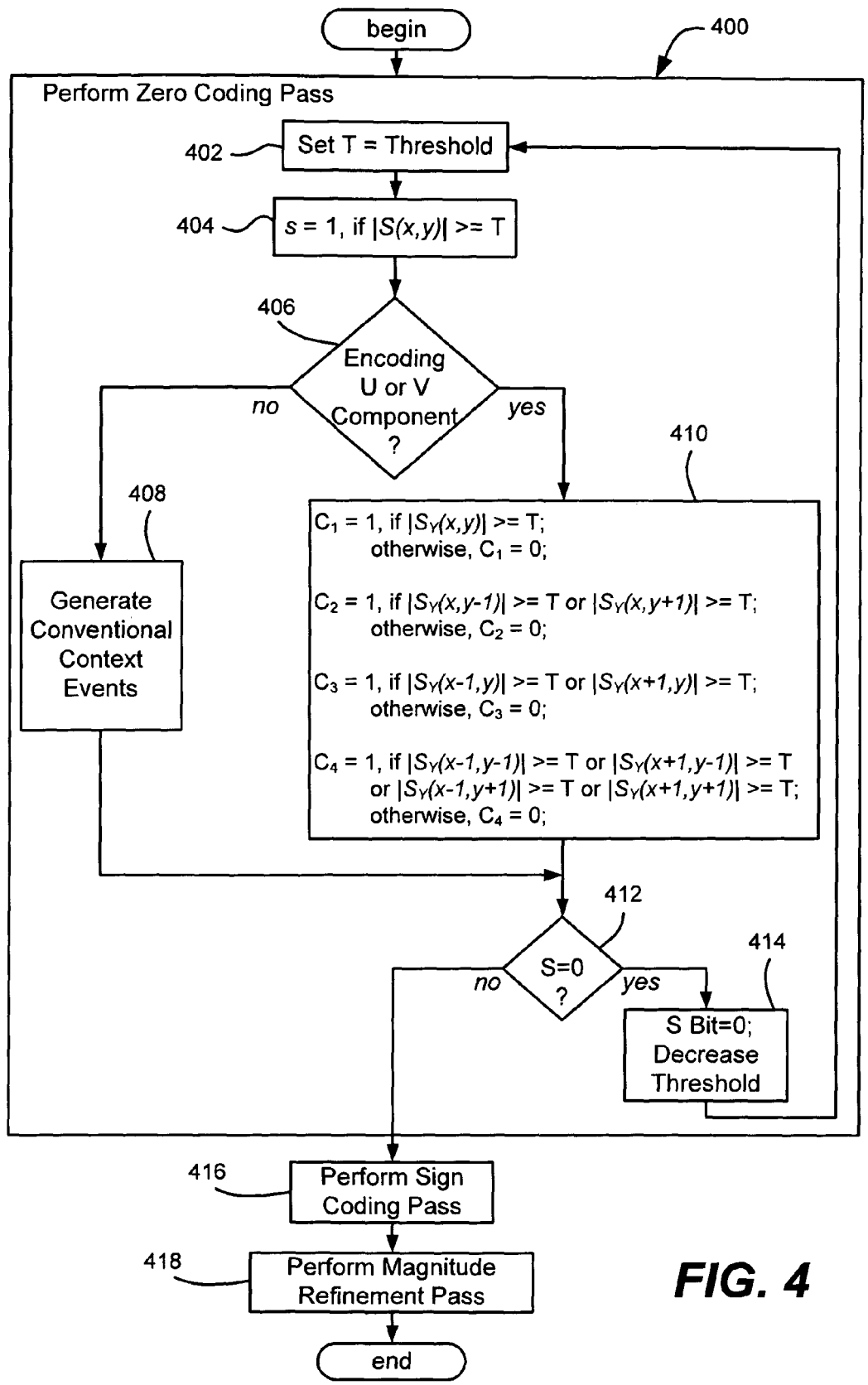
FIG. 4 is a flow diagram representing various example steps taken to generate a symbol and related inter-color context events for a U or V component being coded.

More particularly, as represented in the flow diagram of FIG. 4, for symbol generation 340, the zero coding pass 330 (step 400), S(x,y) is compared with a list 336 of decreasing thresholds T until the absolute value of the coefficient S(x,y) is not less than T (steps 402, 404, 412 and 414). At each comparison at step 402, a binary symbol s is generated: s=1, if |S(x,y)|>=T, otherwise, s=0.

As represented by step 406, depending on whether coding the Y component or the U or V component, step 408 or 408 is executed to generate the context events of s at threshold T. Thus, if Y coding, conventional context events are generated via step 408. Alternatively, if S(x,y) is obtained from the U or V component, then the above-described four inter-color context events, $C_1$, $C_2$, $C_3$ and $C_4$ are obtained via step 410. In any event, as can be seen, s may be coded by context-based arithmetic coding with the found context events. In other words, each s bit generated in zero pass coding has corresponding context events, which in the case of U or V component coding, are the context events $C_1$, $C_2$, $C_3$ and $C_4$ in one example implementation.

As also represented in FIG. 4, once |S(x,y)| is not less than T, that is, s=0 as evaluated at step 412, the sign coding pass is performed, as represented by step 416. To this end, if the coefficient s is positive, a symbol one (binary 1) is generated, otherwise a symbol zero (binary 0) is generated.

After the sign coding pass, the bit-plane representation of S(x,y) at the remaining thresholds is further checked, which is termed the magnitude refinement pass (step 418). This pass further specifies the magnitude of the coefficient in the remaining successively lower magnitude bit planes.

By way of an example, consider how a coefficient "100" (decimal) is coded into symbols. The 8-bits bit plane representation of 100 is 01100100. Hence, the comparison thresholds T equal 128, 64, 32, 16, 8, 4, 2, and 1, respectively. When dealing with the zero coding pass 340 (corresponding to step 400), the highest magnitude bit plane (T=128), it is determined that the coefficient is less than 128. Thus, a symbol 0 is generated. Next, at T=64, the coefficient is greater than T, and a symbol 1 is generated.

At this point, the zero coding pass finishes and the sign coding pass 332 (corresponding to step 416) starts. A symbol 1 is generated for the sign coding pass as the coefficient is positive. Next, From T=32, a series of symbols 1, 0, 0, 1, 0, 0 is generated in the magnitude refinement pass 334 (corresponding to step 418). Thus, the generated symbols 350 for the coefficient "100" are:

Zero coding pass: 0, 1
Sign coding pass: 1
Magnitude refinement pass: 1, 0, 0, 1, 0, 0

These symbols, along with the context events in block 350 obtained from the corresponding Y coefficient and its adjacent Y coefficients obtained in the zero coding pass, are coded by the context-based arithmetic coding 360. These context events are the inter-color context events when U or V coding.

Exemplary Operating Environment

Figure 5:
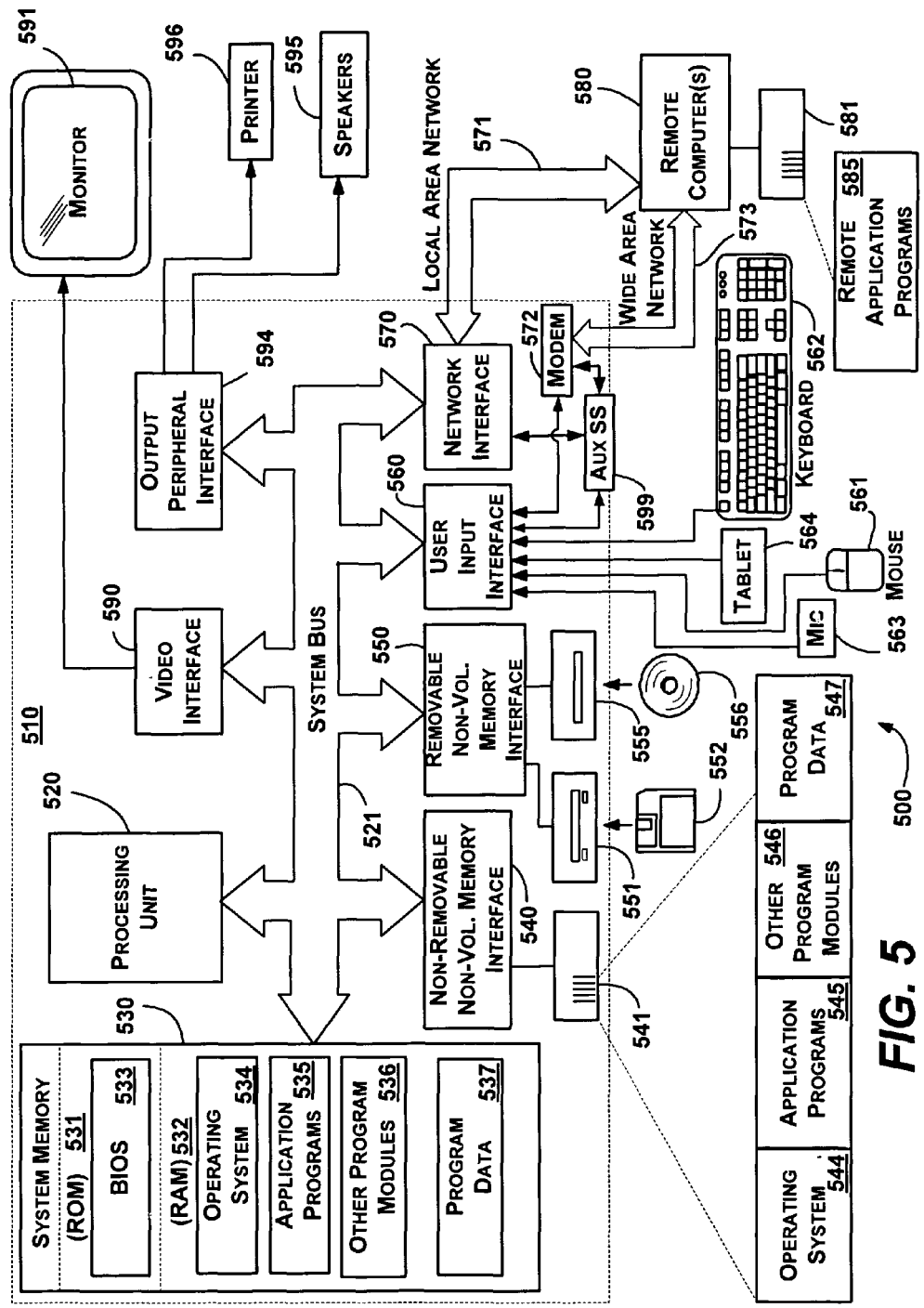
FIG. 5 shows an illustrative example of a general-purpose computing environment including a computer into which various aspects of the present invention may be incorporated.

FIG. 5 illustrates an example of a suitable computing system environment 500 in which the encoder and/or decoder described above with references to FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one ore more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer storage medium having computer executable instructions that, when executed by a computer, cause the computer to perform a method comprising:
    coding a coefficient representative of a chrominance component corresponding to an (x, y) coordinate pair into a symbol;
    computing a plurality of context events based upon a corresponding coefficient of a luminance component at the (x, y) coordinate pair and at least one other coefficient of another luminance component having a coordinate relationship with the (x, y) coordinate pair, wherein the computing the plurality of context events comprises comparing coefficients that have adjacent horizontal, vertical and diagonal relationships with the corresponding coefficient against a threshold value, and wherein the computing the plurality of context events further comprises separately comparing each horizontally-related coefficient against the threshold value and logically combining a result of each horizontally-related luminance coefficient comparison to obtain one value for one context event, and separately comparing each vertically-related coefficient against the threshold value and logically combining a result of each vertically-related coefficient comparison to obtain another value for another context event, and separately comparing each diagonally-related coefficient against the threshold value and logically combining a result of each diagonally-related coefficient comparison to obtain yet another value for yet another context event;
    comparing the coefficients against a decreasing threshold value until the coefficient representative of the chrominance component meets the threshold value;
    halving the threshold value into a new threshold value when the coefficient representative of the chrominance component does not meet the threshold value; and
    associating the symbol with the context events for context-based arithmetic coding.

2. The at least one computer storage medium of claim 1 wherein the steps of coding the coefficient and computing the plurality of context events occurs in a zero coding pass of coding via an entropy coder.

3. The at least one computer storage medium of claim 1, the method further comprising performing a sign coding pass and a magnitude refinement pass to obtain further symbols for the context-based arithmetic coding.

4. The at least one computer storage medium of claim 1 wherein computing the plurality of context events based upon the corresponding coefficient of the luminance component at the (x, y) coordinate pair and at least one other coefficient of another luminance component having a coordinate relationship with the (x, y) coordinate pair comprises, generating four context events, including one context event based on the corresponding coefficient in the luminance component, and three context events based on other luminance coefficients that have adjacent horizontal, vertical and diagonal relationships with the corresponding coefficient.

5. The at least one computer storage medium of claim 1 wherein computing the plurality of context events based upon the corresponding coefficient of the luminance component at the (x, y) coordinate pair and at least one other coefficient of another luminance component having a coordinate relationship with the (x, y) coordinate pair comprises, generating four context events $C_1$-$C_4$ based upon the following computations, where each $|S_Y(\text{x-coordinate identifier, y-coordinate identifier})|$ refers to an absolute value of a coefficient of the luminance component at coordinates relative to the (x, y) coordinate pair, and T refers to a threshold value:

$C_1 = 1$, if $|S_Y(x,y)| \geq T$; otherwise, $C_1 = 0$;
$C_2 = 1$, if $|S_Y(x,y-1)| \geq T$ OR $|S_Y(x,y+1)| \geq T$; otherwise, $C_2 = 0$;
$C_3 = 1$, if $|S_Y(x-1,y)| \geq T$ OR $|S_Y(x+1,y)| \geq T$; otherwise, $C_3 = 0$;
$C_4 = 1$, if $|S_Y(x-1,y-1)| \geq T$ OR $|S_Y(x+1,y-1)| \geq T$ OR $|S_Y(x-1,y+1)| \geq T$ OR $|S_Y(x+1,y+1)| \geq T$; otherwise, $C_4 = 0$.

6. In an image processing environment, a system comprising:
  an encoder configured to input source data and configured to output compressed image data based on the source image data, the encoder including a zero coding pass component, a sign coding pass component and a magnitude refinement coding pass component configured to provide symbols and associated context events to a context-based arithmetic coding component, the zero coding pass component comprising:
    a symbol generator configured to generate at least one zero pass symbol representative of a selected chrominance component; and
    an inter-color context events generator configured to generate the context events for association with each zero pass symbol, the generator configured to generate the context events based on a set of at least two luminance components that each have a relationship with the selected chrominance component,
  wherein the encoder includes a preprocessor configured to separate color data signals into luminance components corresponding to a grayscale image and chrominance components configured to provide color information, a transformer coupled to the preprocessor configured to perform frequency transformation on the output of preprocessor into frequency-transformed data values, a quantizer coupled to the transformer configured to aggregate the data values into aggregated data values, and an entropy coder coupled to the quantizer configured to generate the compressed image data from the aggregated data values, the entropy coder including the zero coding pass component, the sign coding pass component, the magnitude refinement coding pass component, and the context-based arithmetic coding component.

7. The system of claim 6 wherein the relationship with the selected chrominance component comprises is based upon an (x, y) coordinate pair of the selected chrominance component, and wherein the inter-color context events generator generates four context events by processing coefficients of luminance components, including a first luminance component at an (x, y) coordinate pair that corresponds to the chrominance component's (x, y) coordinate pair, a second context event based on luminance coefficients that have a horizontal relationship with the (x, y) coordinate pair, a third context event based on luminance coefficients that have a vertical relationship with the (x, y) coordinate pair, and a fourth context event based on luminance coefficients that have a diagonal relationship with the (x, y) coordinate pair.

8. The system of claim 6 further comprising a channel for transmitting or storing the compressed image data, or for both storing and transmitting the compressed image data, and further comprising a decoder including an entropy decoder that processes the compressed image data into aggregated data values, a dequantizer coupled to the entropy decoder to convert the aggregated data values into frequency transformed data values, and an inverse transformer coupled to the dequantizer to process frequency transformed data values into luminance components corresponding to a grayscale image and chrominance components that provide color information.

9. A method comprising:
  coding a coefficient representative of a chrominance component corresponding to an (x, y) coordinate pair into a symbol;
  computing a plurality of context events based upon a corresponding coefficient of a luminance component at the (x, y) coordinate pair and at least one other coefficient of another luminance component having a coordinate relationship with the (x, y) coordinate pair, wherein the computing the plurality of context events comprises comparing coefficients that have adjacent horizontal, vertical and diagonal relationships with the corresponding coefficient against a threshold value, and wherein the computing the plurality of context events further comprises separately comparing each horizontally-related coefficient against the threshold value and logically combining a result of each horizontally-related luminance coefficient comparison to obtain one value for one context event, and separately comparing each vertically-related coefficient against the threshold value and logically combining a result of each vertically-related coefficient comparison to obtain another value for another context event, and separately comparing each diagonally-related coefficient against the threshold value and logically combining a result of each diagonally-related coefficient comparison to obtain yet another value for yet another context event;
  comparing the coefficients against a decreasing threshold value until the coefficient representative of the chrominance component meets the threshold value;
  halving the threshold value into a new threshold value when the coefficient representative of the chrominance component does not meet the threshold value; and
  associating the symbol with the context events for context-based arithmetic coding.

10. The method of claim 9 wherein the steps of coding the coefficient and computing the plurality of context events occurs in a zero coding pass of coding via an entropy coder.

11. The method of claim 9, the method further comprising performing a sign coding pass and a magnitude refinement pass to obtain further symbols for the context-based arithmetic coding.

12. The method of claim 9 wherein computing the plurality of context events based upon the corresponding coefficient of the luminance component at the (x, y) coordinate pair and at least one other coefficient of another luminance component having a coordinate relationship with the (x, y) coordinate pair comprises, generating four context events, including one context event based on the corresponding coefficient in the luminance component, and three context events based on other luminance coefficients that have adjacent horizontal, vertical and diagonal relationships with the corresponding coefficient.

13. The method of claim 9 wherein computing the plurality of context events based upon the corresponding coefficient of the luminance component at the (x, y) coordinate pair and at least one other coefficient of another luminance component having a coordinate relationship with the (x, y) coordinate pair comprises, generating four context events $C_1$-$C_4$ based upon the following computations, where each $|S_Y(\text{x-coordinate identifier, y-coordinate identifier})|$ refers to an absolute value of a coefficient of the luminance component at coordinates relative to the (x, y) coordinate pair, and T refers to a threshold value:

$C_1 = 1$, if $|S_Y(x,y)| >= T$; otherwise, $C_1 = 0$;
$C_2 = 1$, if $|S_Y(x,y-1)| >= T$ OR $|S_Y(x,y+1)| >= T$; otherwise, $C_2 = 0$;
$C_3 = 1$, if $|S_Y(x-1,y)| >= T$ OR $|S_Y(x+1,y)| >= T$; otherwise, $C_3 = 0$;
$C_4 = 1$, if $|S_Y(x-1,y-1)| >= T$ OR $|S_Y(x+1,y-1)| >= T$ OR $|S_Y(x-1,y+1)| >= T$ OR $|S_Y(x+1,y+1)| >= T$; otherwise, $C_4 = 0$.

\* \* \* \* \*